(12) United States Patent
Fujii et al.

(10) Patent No.: US 12,018,182 B2
(45) Date of Patent: Jun. 25, 2024

(54) THERMOPLASTIC RESIN COMPOSITION AND HOT-MELT ADHESIVE

(71) Applicant: IDEMITSU KOSAN CO.,LTD., Chiyoda-ku (JP)

(72) Inventors: Nozomu Fujii, Sumida-ku (JP); Masami Kanamaru, Chiba (JP); Asami Koga, Taito-ku (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 690 days.

(21) Appl. No.: 17/271,989

(22) PCT Filed: Sep. 2, 2019

(86) PCT No.: PCT/JP2019/034463
§ 371 (c)(1),
(2) Date: Feb. 26, 2021

(87) PCT Pub. No.: WO2020/050225
PCT Pub. Date: Mar. 12, 2020

(65) Prior Publication Data
US 2021/0348039 A1    Nov. 11, 2021

(30) Foreign Application Priority Data

Sep. 4, 2018  (JP) ................................ 2018-165332

(51) Int. Cl.
*C09J 123/12* (2006.01)
*C09J 5/06* (2006.01)
*C09J 11/08* (2006.01)
*C09J 123/08* (2006.01)
*C09J 191/00* (2006.01)

(52) U.S. Cl.
CPC ............... *C09J 123/12* (2013.01); *C09J 5/06* (2013.01); *C09J 11/08* (2013.01); *C09J 123/0815* (2013.01); *C09J 191/00* (2013.01); *C09J 2423/04* (2013.01); *C09J 2423/10* (2013.01); *C09J 2491/00* (2013.01)

(58) Field of Classification Search
CPC .. C09J 123/12; C09J 191/00; C09J 123/0815; C09J 2491/00; C09J 5/06; C09J 2423/04; C09J 2423/10; C09J 11/08
USPC ........................................................ 524/480
See application file for complete search history.

(56) References Cited

U.S. PATENT DOCUMENTS

| | | | |
|---|---|---|---|
| 9,803,113 B2 | 10/2017 | Tse | |
| 2002/0016402 A1 | 2/2002 | Kuno et al. | |
| 2007/0251572 A1* | 11/2007 | Hoya | C08L 53/02 |
| | | | 174/110 SR |
| 2013/0302590 A1 | 11/2013 | Hatanaka et al. | |
| 2014/0350155 A1* | 11/2014 | Hamann | C09J 157/02 |
| | | | 524/226 |
| 2015/0174865 A1* | 6/2015 | Hatanaka | B32B 27/32 |
| | | | 428/141 |
| 2015/0275054 A1* | 10/2015 | Minami | C09J 123/12 |
| | | | 525/240 |
| 2015/0368522 A1 | 12/2015 | Fujinami et al. | |
| 2016/0230055 A1 | 8/2016 | Hamann et al. | |
| 2017/0114257 A1* | 4/2017 | Hussein | C08L 23/142 |
| 2017/0355888 A1* | 12/2017 | Kobayashi | C08F 110/06 |
| 2019/0044422 A1 | 2/2019 | Suzuki et al. | |
| 2021/0032510 A1* | 2/2021 | Kanamaru | C09J 123/14 |

FOREIGN PATENT DOCUMENTS

| | | |
|---|---|---|
| CN | 103328594 A | 9/2013 |
| CN | 105008414 A | 10/2015 |
| CN | 105308141 A | 2/2016 |
| EP | 1 820 821 A1 | 8/2007 |
| EP | 2 915 825 A1 | 9/2015 |
| EP | 3 159 387 A1 | 4/2017 |
| JP | 4-236287 A | 8/1992 |
| JP | 2006-56914 A | 3/2006 |
| JP | 2012-153765 A | 8/2012 |
| JP | 2013-64056 A | 4/2013 |
| JP | 2016-102162 A | 6/2016 |
| JP | 2016-524002 A | 8/2016 |
| JP | 2016-155916 A | 9/2016 |
| JP | 2017-95685 A | 6/2017 |
| JP | 2017-195685 A | 10/2017 |
| WO | WO 2006/057361 A1 | 6/2006 |
| WO | WO 2014/069606 A1 | 5/2014 |

(Continued)

OTHER PUBLICATIONS

Indian Office Action issued Jul. 1, 2022 in Indian Patent Application No. 202147008662, 7 pages.
Chinese Office Action issued Jul. 17, 2023 in Chinese Patent Application No. 201980057017.1 (with English machine translation), 21 pages.
Office Action issued Feb. 7, 2023, in corresponding Japanese Patent Application No. 2020-541213 (with English Translation), 6 pages.
International Search Report issued on Nov. 5, 2019 in PCT/JP2019/034463 filed on Sep. 2, 2019, 2 pages.
Extended European Search Report issued Apr. 4, 2022, in corresponding European Patent Application No. 19856891.7, 12 pages.

(Continued)

*Primary Examiner* — Hui H Chin
(74) *Attorney, Agent, or Firm* — Oblon, McClelland, Maier & Neustadt, L.L.P.

(57) ABSTRACT

The present invention relates to a thermoplastic resin composition containing a base polymer containing a propylene-based polymer (A) in which a melting endotherm (ΔH-D) is 0 J/g or more and 60 J/g or less, and a melting point (Tm-D) is not observed or is 0° C. or higher and 120° C. or lower; and a propylene-based polymer (C) in which a melting endotherm (ΔH-D) is 20 J/g or more and 120 J/g or less, and a melting point (Tm-D) is higher than 120° C., the content of the propylene-based polymer (C) being 0.5 parts by mass or more and 100 parts by mass or less relative to 100 parts by mass of the content of the propylene-based polymer (A).

20 Claims, No Drawings

(56) References Cited

FOREIGN PATENT DOCUMENTS

WO     WO 2014/190098 A1    11/2014
WO     WO 2014/192767 A1    12/2014

OTHER PUBLICATIONS

Office Action issued Jun. 27, 2023, in corresponding Japanese Patent Application No. 2020-541213 (with English Translation), 5 pages.
Combined Chinese Office Action and Search Report issued Feb. 14, 2023 in Chinese Application 201980057017.1, (with English Translation) 18 pages.
Chinese Office Action issued Oct. 18, 2023 in Chinese Application 201980057017.1, (with unedited computer-generated English translation), 21 pages.
European Office Action issued Oct. 31, 2023 in European Application 19856891.7, 4 pages.
Indian Office Action issued Nov. 1, 2023 in Indian Application 202147008662, 4 pages.

* cited by examiner

THERMOPLASTIC RESIN COMPOSITION AND HOT-MELT ADHESIVE

CROSS-REFERENCE TO RELATED APPLICATIONS

The present application is the national stage of international application PCT/JP2019/034463, filed on Sep. 2, 2019, and claims the benefit of the filing date of Japanese Appl. No. 2018-165332, filed on Sep. 4, 2018.

TECHNICAL FIELD

The present invention relates to a thermoplastic resin composition and a hot-melt adhesive composed of the thermoplastic resin composition.

BACKGROUND ART

A hot-melt adhesive is a solvent-free adhesive and exhibits adhesiveness when it is heat-melted and coated onto an adherend, followed by cooling for solidification. In recent years, the hot-melt adhesive is extended in the uses in various fields because it is excellent in high-speed coatability, fast curability, solvent-free properties, barrier properties, energy-saving properties, economy, and so on.

As a base polymer of a hot-melt adhesive, propylene-based polymers are widely used from the viewpoint of heat stability. Above all, a low-molecular weight polypropylene resulting from polymerization using a metallocene catalyst can be suitably used as the base polymer of various hot-melt adhesives because it is high in flowability, is excellent in coatability when used as the hot-melt adhesive, is excellent in adhesive strength relative to a low-polar substance, such as polypropylene, and is excellent in heat stability at the time of heat melting (see PTLs 1 to 3).

CITATION LIST

Patent Literature

PTL 1: WO 2014/192767 A
PTL 2: JP 2013-064056 A
PTL 3: JP 2016-524002 A

SUMMARY OF INVENTION

Technical Problem

The aforementioned low-molecular weight polypropylene resulting from polymerization using a metallocene-based catalyst is slow in crystallization rate. Therefore, the hot-melt adhesive using this is relatively slow in solidification time, is favorable in followability to an adherend, and is excellent in adhesiveness; on the other hand, it is hardly solidified. When the solidification time is slow, in the case of laminating and bonding a porous substrate, such as a nonwoven fabric, a phenomenon named as so-called striking-through, in which the adhesive oozes out from the adhesive-applied surface side toward the surface at the opposite side, is liable to occur. In addition, in applications for building materials or wrappings in which quick adhesive strength is required to develop, there is a possibility that a risk in which the bonding position deviates after applying the adhesive, or blocking occurs to lower the productivity.

In consequence, a problem to be solved by the present invention is to provide a hot-melt adhesive with an excellent solidification speed.

Solution to Problem

Disclosures of the present application are concerned with the following thermoplastic resin composition and hot-melt adhesive.

<1> A thermoplastic resin composition containing:
a base polymer containing a propylene-based polymer (A) in which a melting endotherm ($\Delta$H-D) is 0 J/g or more and 60 J/g or less, and a melting point (Tm-D) is not observed or is 0° C. or higher and 120° C. or lower; and
a propylene-based polymer (C) in which a melting endotherm ($\Delta$H-D) is 20 J/g or more and 120 J/g or less, and a melting point (Tm-D) is higher than 120° C.,
the content of the propylene-based polymer (C) being 0.5 parts by mass or more and 200 parts by mass or less relative to 100 parts by mass of the content of the propylene-based polymer (A).

<2> The thermoplastic resin composition as set forth in the above <1>, wherein the melting point (Tm-D) of the propylene-based polymer (C) is 150° C. or lower.

<3> The thermoplastic resin composition as set forth in the above <1> or <2>, wherein the base polymer further contains an ethylene-based polymer (B) in which a melting endotherm ($\Delta$H-D) is 0 J/g or more and 120 J/g or less,
the content of the ethylene-based polymer (B) in the thermoplastic resin composition being 10,000 parts by mass or less relative to 100 parts by mass of the content of the propylene-based polymer (A).

<4> The thermoplastic resin composition as set forth in the above <3>, wherein the total content of the propylene-based polymer (A) and the ethylene-based polymer (B) occupying in the thermoplastic resin composition is more than 70% by mass.

<5> The thermoplastic resin composition as set forth in the above <3>, wherein the total content of the propylene-based polymer (A) and the ethylene-based polymer (B) occupying in the thermoplastic resin composition is 70% by mass or less.

<6> The thermoplastic resin composition as set forth in any one of the above <3> to <5>, wherein the content of the propylene-based polymer (A) is 50% by mass or more relative to 100 parts by mass of the total amount of the propylene-based polymer (A) and the ethylene-based polymer (B).

<7> The thermoplastic resin composition as set forth in any one of the above <1> to <6>, further containing a linear hydrocarbon-based wax (D) in which a melting endotherm ($\Delta$H-D) is more than 120 J/g and 300 J/g or less,
the content of the linear hydrocarbon-based wax (D) being 10,000 parts by mass or less relative to 100 parts by mass of the content of the base polymer.

<8> The thermoplastic resin composition as set forth in any one of the above <1> to <7>, wherein the propylene-based polymer (A) is a propylene homopolymer.

<9> The thermoplastic resin composition as set forth in any one of the above <1> to <7>, wherein the propylene-based polymer (A) contains at least one structural unit selected from the group consisting of ethylene and an $\alpha$-olefin having 4 to 30 carbon atoms in an amount of more than 0 mol % and 40 mol % or less.

<10> The thermoplastic resin composition as set forth in any one of the above <1> to <9>, further containing an oil (E).

<11> The thermoplastic resin composition as set forth in any one of the above <1> to <10>, further containing a tackifier (F).
<12> The thermoplastic resin composition as set forth in any one of the above <1> to <11>, further containing a nucleating agent (G).
<13> The thermoplastic resin composition as set forth in <12>, wherein the nucleating agent (G) is at least one selected from the group consisting of a sorbitol-based nucleating agent and a nonitol-based nucleating agent.
<14> A method of producing the thermoplastic resin composition as set forth in any one of the above <1> to <13>, including a step of mixing at least the base polymer and the propylene-based polymer (C) at lower than 160° C.
<15> A hot-melt adhesive composed of the thermoplastic resin composition as set forth in any one of the above <1> to <13>.

Advantageous Effects of Invention

The hot-melt adhesive composed of the thermoplastic resin composition of the present invention is excellent in solidification speed.

DESCRIPTION OF EMBODIMENTS

The present invention is hereunder described in detail. In this specification, the numerical range expressed by the wording "A to B" means "A or more and B or less" (in the case of A<B) or "A or less and B or more" (in the case of A>B). In the present invention, a combination of preferred embodiments is a more preferred embodiment.
[Thermoplastic Resin Composition]
The thermoplastic resin composition of the present embodiment contains, as essential components, a base polymer containing a specified propylene-based polymer (A) and a specified propylene-based polymer (C). The base polymer which is contained in the thermoplastic resin composition of the present embodiment may further contain a specified ethylene-based polymer (B). In addition, the thermoplastic resin composition of the present embodiment may further contain a specified linear hydrocarbon-based wax (D).
<Propylene-Based Polymer (A)>
The base polymer which is contained in the thermoplastic resin composition of the present embodiment contains a propylene-based polymer (A) in which a melting endotherm (ΔH-D) is 0 J/g or more and 60 J/g or less, and a melting point (Tm-D) is not observed or is 0° C. or higher and 120° C. or lower.
The melting endotherm (ΔH-D) of the propylene-based polymer (A) is 0 J/g or more and 60 J/g or less. When the melting endotherm (ΔH-D) of the propylene-based polymer (A) is more than 60 J/g, there is concern that the interfacial adhesive strength is lowered. From the viewpoint of adhesive strength and flexibility of the hot-melt adhesive, the melting endotherm (ΔH-D) is preferably 20 J/g or more, more preferably 25 J/g or more, still more preferably 27 J/g or more, and yet still more preferably 30 J/g or more, and it is preferably 50 J/g or less, more preferably 45 J/g or less, and still more preferably 40 J/g or less. The melting endotherm (ΔH-D) can be controlled by appropriately regulating the monomer concentration or the reaction pressure.
The melting endotherm (ΔH-D) is obtained from a melting endothermic curve obtained in a manner in which using a differential scanning calorimeter (DSC), a sample is kept at −10° C. in a nitrogen atmosphere for 5 minutes and then subjected to temperature rise at a rate of 10° C./min. Specifically, the melting endotherm (ΔH-D) is calculated in a manner in which when a line connecting a point at a low-temperature side at which no heat quantity change is observed with a point at a high-temperature side at which no heat quantity change is observed is designated as a base line, an area surrounded by a line portion containing a peak observed at a highest-temperature side of the melting endothermic curve obtained by the DSC measurement and the base line is determined.

The melting point (Tm-D) of the propylene-based polymer (A) is not observed or is 0° C. or higher and 120° C. or lower from the viewpoint of adhesive strength of the hot-melt adhesive. In the case where the melting point is observed, from the same viewpoint, the melting point is preferably 30° C. or higher, more preferably 45° C. or higher, still more preferably 60° C. or higher, and yet still more preferably 75° C. or higher, and it is preferably 95° C. or lower, more preferably 90° C. or lower, and still more preferably 85° C. or lower. It is possible to control the melting point by appropriately regulating the monomer concentration or the reaction pressure.

In the present invention, when using a differential scanning calorimeter (DSC) ("DSC 7", manufactured by PerkinElmer), 10 mg of a sample is kept at −10° C. in a nitrogen atmosphere for 5 minutes and then subjected to temperature rise at a rate of 10° C./min, a peak top of peaks observed at a highest temperature side of the obtained melting endothermic curve is defined as the melting point (Tm-D).

Although the propylene-based polymer (A) is not particularly restricted so long as the aforementioned melting endotherm (ΔH-D) and melting point (Tm-D) satisfy the aforementioned ranges, respectively, it is preferably a propylene-based polymer selected from a propylene homopolymer, a propylene-ethylene block copolymer, a propylene-butene block copolymer, a propylene-α-olefin block copolymer, a propylene-ethylene random copolymer, a propylene-butene random copolymer, a propylene-α-olefin random copolymer, a propylene-α-olefin graft copolymer, and the like. Above all, a propylene homopolymer and a propylene-ethylene random copolymer are more preferred, and a propylene homopolymer is still more preferred.

In the case where the propylene-based polymer (A) is a copolymer, from the viewpoint of copolymerizability, the propylene-based polymer (A) preferably contains at least one structural unit selected from the group consisting of ethylene and an α-olefin having 4 to 30 carbon atoms in an amount of more than 0 mol % and 40 mol % or less. From such viewpoint, the content of the foregoing structural unit is more preferably 0.5 mol % or more, and still more preferably 1.0 mol % or more, and it is more preferably 20 mol % or less, still more preferably 17.5 mol % or less, and yet still more preferably 15 mol % or less.

The α-olefin having 4 to 30 carbon atoms is preferably an α-olefin having 4 to 24 carbon atoms, more preferably an α-olefin having 4 to 12 carbon atoms, and still more preferably an α-olefin having 4 to 8 carbon atoms. Specific examples of the α-olefin include 1-butene, 1-pentene, 4-methyl-1-pentene, 1-hexene, 1-octene, 1-decene, 1-dodecene, 1-tetradecene, 1-hexadecene, 1-octadecene, and 1-eicosene.

In the case where the propylene-based polymer (A) is a copolymer containing an olefin having 2 carbon atoms, the content of structural unit of the olefin having 2 carbon atoms (namely, an ethylene monomer) is preferably more than 0 mol % and 20 mol % or less, more preferably more than 0 mol % and 18 mol % or less, still more preferably more than 0 mol % and 16 mol % or less, and yet still more preferably more than 0 mol % and 14 mol % or less. In addition, in the case where the propylene-based polymer (A) is a copolymer containing an α-olefin having 4 or more carbon atoms, the content of the α-olefin having 4 or more carbon atoms is preferably more than 0 mol % and 30 mol % or less, more preferably more than 0 mol % and 25 mol % or less, and still more preferably more than 0 mol % and 20 mol % or less.

The propylene-based polymer (A) can be obtained through polymerization of the monomer or monomers in the presence of a polymerization catalyst, such as a Ziegler-Natta type catalyst and a metallocene catalyst. Above all, the propylene-based polymer (A) is preferably a polypropylene-based resin obtained using a metallocene catalyst. The metallocene catalyst is one kind of homogenous catalysts, and the obtained polymer becomes a homogenous polymer having a narrow molecular weight distribution or a narrow composition distribution.

A weight average molecular weight (Mw) of the propylene-based polymer (A) is preferably 20,000 or more, more preferably 25,000 or more, and still more preferably 30,000 or more from the viewpoint of adhesive strength, and it is preferably 300,000 or less, more preferably 200,000 or less, and still more preferably 150,000 or less from the viewpoint of coatability.

In the present invention, the weight average molecular weight (Mw) is a weight average molecular weight expressed in terms of polystyrene as measured by the gel permeation chromatography (GPC).

A molecular weight distribution (Mw/Mn) of the propylene-based polymer (A) is preferably 3.0 or less, more preferably 2.8 or less, still more preferably 2.6 or less, and yet still more preferably 2.5 or less, and it is preferably 1.5 or more, more preferably 1.6 or more, still more preferably 1.7 or more, and yet still more preferably 1.8 or more. By allowing the molecular weight distribution (Mw/Mn) to fall within the aforementioned range, the flexibility of the resin composition can be more enhanced, and the sticking of the resin composition can be more suppressed.

In the present embodiment, the molecular weight distribution (Mw/Mn) is a value calculated from the weight average molecular weight Mw and the number average molecular weight Mn expressed in terms of polystyrene as measured by the gel permeation chromatography (GPC).

A commercially available product can be used as the propylene-based polymer (A). Specific examples thereof include "S400", "S410", "S600", and "S901" of "L-MODU" (registered trademark) (manufactured by Idemitsu Kosan Co., Ltd.). Examples of a commercially available product of an amorphous poly-α-olefin (APAO) include "REXtac", manufactured by REXtac LLC; "Vestoplast", manufactured by Evonik Industries AG; and "Eastoflex" and "Aerafin", manufactured by Eastman Chemical Company (all of which are a trade name). Examples of a commercially available product of a propylene-based elastomer include "TAFMER XM", "TAFMER PN", and "TAFMER SN", manufactured by Mitsui Chemicals, Inc.; "Prime TPO", manufactured by Prime Chemical Co., Ltd.; "Versify", manufactured by The Dow Chemical Company; "Vistamaxx" and "Linxar", manufactured by Exxon Mobil Chemical Company; "Licocene", manufactured by Clariant AG; and "Adflex", manufactured LyondellBasell Industries N.V. (all of which are a trade name).

<Ethylene-Based Polymer (B)>

The base polymer which is contained in the thermoplastic resin composition of the present embodiment may contain an ethylene-based polymer (B) in which a melting endotherm (ΔH-D) is 0 J/g or more and 120 J/g or less.

From the viewpoint of flexibility, the melting endotherm (ΔH-D) of the ethylene-based polymer (B) is preferably 20 J/g or more, and more preferably 40 J/g or more, and it is preferably 100 J/g or less, and more preferably 80 J/g or less. The melting endotherm (ΔH-D) of the ethylene-based polymer (B) is measured in the same manner as in the aforementioned melting endotherm (ΔH-D) of the propylene-based polymer (A).

From the viewpoint of coatability, the melting point (Tm-D) of the ethylene-based polymer (B) is preferably 30° C. or higher, and more preferably 50° C. or higher, and it is preferably 130° C. or lower, and more preferably 120° C. or lower. In addition, preferably, it may be lower than 85° C., and more preferably, it may be 80° C. or lower. The melting point (Tm-D) of the ethylene-based polymer (B) is measured in the same manner as in the aforementioned melting point (Tm-D) of the propylene-based polymer (A).

The ethylene-based polymer (B) is an ethylene homopolymer or an ethylene-based copolymer. The ethylene-based copolymer refers to a copolymer of ethylene and a copolymerizable monomer which may be copolymerized with ethylene. Examples of the copolymerizable monomer include an α-olefin; a carboxylic acid (ester), such as vinyl acetate, (meth)acrylic acid, a (meth)acrylic acid ester, maleic acid, and a maleic acid ester; and a carboxylic acid anhydride, such as maleic anhydride, phthalic anhydride, and succinic anhydride. Such a copolymerizable monomer may be solely copolymerized with ethylene, or two or more copolymerizable monomers may be copolymerized with ethylene. Examples of the ethylene-based copolymer include an ethylene/α-olefin copolymer, an ethylene/carboxylic acid copolymer, an ethylene/carboxylic acid ester copolymer, and an ethylene/carboxylic acid anhydride copolymer.

In this specification, the (meth)acrylic acid refers to a concept including both methacrylic acid and acrylic acid. Specific examples of the (meth)acrylic acid ester include methyl acrylate, ethyl acrylate, n-propyl acrylate, n-butyl acrylate, isobutyl acrylate, 2-ethylhexyl acrylate, 2-hydroxyethyl acrylate, isooctyl acrylate, methyl methacrylate, ethyl methacrylate, and glycidyl methacrylate.

From the viewpoint of adhesiveness and offensive odor of the hot-melt adhesive, the ethylene-based polymer (B) preferably contains at least one structural unit selected from the group consisting of α-olefins having 3 to 30 carbon atoms (preferably 3 to 10 carbon atoms) in an amount of more than 0 mol % and 40 mol % or less. The ethylene-based polymer (B) is preferably an ethylene/α-olefin copolymer, and more preferably a copolymer of ethylene and an α-olefin having 3 to 30 carbon atoms (preferably 3 to 10 carbon atoms). In addition, the ethylene-based polymer (B) is preferably an ethylene/α-olefin copolymer obtained through polymerization using a metallocene catalyst. Specific examples of the α-olefin include propylene, 1-butene, 1-pentene, 4-methyl-1-pentene, 1-hexene, 1-octene, 1-decene, 1-dodecene, 1-tetradecene, 1-hexadecene, 1-octadecene, and 1-eicosene. In the present invention, one or more thereof can be used. Of these α-olefins, propylene and 1-octene are preferred. From the viewpoint of adhesiveness, the ethylene-based polymer (B) which is used in the present invention is more preferably an ethylene-1-octene copolymer, and still more preferably an ethylene-1-octene copolymer containing 5 to 20 mol % of a structural unit derived from 1-octene. In the case where the hot-melt adhesive composed of the thermoplastic resin composition of the present invention contains an ethylene/α-olefin copolymer obtained through polymerization using a metallocene catalyst, it is improved in spiral coating adaptability at a low temperature, and it is further excellent in adhesiveness to a polyethylene film or a nonwoven fabric.

Examples of a commercially available product of the ethylene-based polymer (B) which is used in the present invention include "Exact" Series (manufactured by Exxon Mobil Chemical Company); and "Affinity Polymer" Series and "Infuse" Series (manufactured by The Dow Chemical Company), and more preferably, "Affinity GA1875", "Affinity GA1900", "Affinity GA1950", "Affinity GP1570", "Infuse 9807", and "Infuse 9817" (manufactured by The Dow Chemical Company) (all of which are a trade name).

From the viewpoint of improvement in flexibility and improvement in coatability, the content of the ethylene-based polymer (B) in the thermoplastic resin composition of the present embodiment is preferably 10,000 parts by mass or less, more preferably 7,500 parts by mass or less, and still more preferably 5,000 parts by mass or less relative to 100 parts by mass of the content of the propylene-based polymer (A).

When the content of the ethylene-based polymer (B) in the base polymer increases, the strength is lowered. For that reason, it is preferred to appropriately determine the content of the ethylene-based polymer (B) according to the application of the hot-melt adhesive composed of the thermoplastic resin composition.

The content of the propylene-based polymer (A) is preferably 25% by mass or more, more preferably 50% by mass or more, and still more preferably 75% by mass or more relative to 100% by mass of the total amount of the propylene-based polymer (A) and the ethylene-based polymer (B).

The content of the base polymer occupying in the thermoplastic resin composition of the present embodiment can be appropriately determined according to the application of the hot-melt adhesive composed of the thermoplastic resin composition, and it may be 65% by mass or more and may be more than 70% by mass, and it may be 70% by mass or less and may be less than 65% by mass, relative to 100% by mass of the thermoplastic resin composition.

The total content of the propylene-based polymer (A) and the ethylene-based polymer (B) occupying in the thermoplastic resin composition of the present embodiment can be appropriately determined according to the application of the hot-melt adhesive composed of the thermoplastic resin composition, and it may be 65% by mass or more and may be more than 70% by mass, and it may be 70% by mass or less and may be less than 65% by mass.

Although the base polymer may contain other component than the propylene-based polymer (A) and the ethylene-based polymer (B), the total content of the propylene-based polymer (A) and the ethylene-based polymer (B) is preferably 60% by mass or more, more preferably 80% by mass or more, still more preferably 90% by mass or more, and yet still more preferably substantially 100% by mass relative to 100% by mass of the base polymer.

<Propylene-Based Polymer (C)>

The thermoplastic resin composition of the present embodiment contains a propylene-based polymer (C) in which a melting endotherm ($\Delta$H-D) is 20 J/g or more and 120 J/g or less, and a melting point (Tm-D) is higher than 120° C. In view of the fact that the thermoplastic resin composition of the present embodiment contains the propylene-based polymer (C) in addition to the base polymer containing the propylene-based polymer (A), the solidification speed of the hot-melt adhesive can be enhanced.

From such viewpoint, the melting point (Tm-D) of the propylene-based polymer (C) is preferably 125° C. or higher, and more preferably 130° C. or higher. Although an upper limit thereof is not particularly restricted, in the case of taking into consideration easiness of mixing with the base polymer, it is preferably 160° C. or lower, and more preferably 150° C. or lower. In addition, the thermoplastic resin composition prepared through mixing at 160° C. or lower is able to suppress worsening of hue to be caused owing to thermal deterioration, so that a favorable appearance is provided. The melting point (Tm-D) of the propylene-based polymer (C) is measured in the same manner as in the aforementioned melting point (Tm-D) of the propylene-based polymer (A).

From the viewpoint of crystallization rate, the melting endotherm ($\Delta$H-D) of the propylene-based polymer (C) is 20 J/g or more, preferably 40 J/g or more, and more preferably more than 60 J/g, and it is 120 J/g or less, preferably 110 J/g or less, and more preferably 100 J/g or less. The melting endotherm ($\Delta$H-D) of the propylene-based polymer (C) is measured in the same manner as in the aforementioned melting endotherm ($\Delta$H-D) of the propylene-based polymer (A).

Specific examples of the propylene-based polymer (C) include a propylene homopolymer and a propylene/$\alpha$-olefin copolymer. In addition, modified products of these polymers can also be used. Examples of the modification include maleic acid modification, silane modification, and chlorination modification. In consequence, specific examples of the propylene-based polymer (C) may include a maleic acid-modified propylene homopolymer, a maleic acid-modified propylene/$\alpha$-olefin copolymer, a silane-modified propylene homopolymer, a silane-modified propylene/$\alpha$-olefin copolymer, a chlorination-modified propylene homopolymer, and a chlorination-modified propylene/$\alpha$-olefin copolymer.

The content of the propylene-based polymer (C) in the thermoplastic resin composition of the present embodiment is 0.5 parts by mass or more, preferably 1 part by mass or more, and more preferably 2 parts by mass or more, and it is 200 parts by mass or less, preferably 100 parts by mass or less, more preferably 75 parts by mass or less, and still more preferably 50 parts by mass or less, relative to 100 parts by mass of the content of the propylene-based polymer (A).

<Linear Hydrocarbon-Based Wax (D)>

The thermoplastic resin composition of the present embodiment may contain a linear hydrocarbon-based wax (D) in which a melting endotherm ($\Delta$H-D) is more than 120 J/g and 300 J/g or less.

From the viewpoint of solidification speed, the melting endotherm ($\Delta$H-D) of the linear hydrocarbon-based wax (D) is preferably 140 J/g or more, and more preferably 160 J/g or more, and it is preferably 280 J/g or less, and more preferably 250 J/g or less. The melting endotherm ($\Delta$H-D) of the linear hydrocarbon-based wax (D) is measured in the same manner as in the aforementioned melting endotherm ($\Delta$H-D) of the propylene-based polymer (A).

A melting point (Tm-D) of the linear hydrocarbon-based wax (D) is preferably 50° C. or higher, and more preferably 80° C. or higher, and it is preferably 150° C. or lower, and more preferably 130° C. or lower. The melting point (Tm-D) of the linear hydrocarbon-based wax (D) is measured in the same manner as in the aforementioned melting point (Tm-D) of the propylene-based polymer (A).

Examples of the linear hydrocarbon-based wax include a paraffin wax, a higher fatty acid wax, a higher fatty acid ester wax, a Fischer-Tropsch wax, a polyethylene wax, and a polypropylene wax (provided that those corresponding to the ethylene-based polymer (B) or the propylene-based polymer (C) are excluded).

Examples of a commercially available product of the linear hydrocarbon-based wax (D) include those mentioned below.

Examples of the Fischer-Tropsch wax include "Sasol H-1", manufactured by Sasol Limited, and examples of the low-density polyethylene-based wax include "Hi-WAX" NL Series, manufactured by Mitsui Chemicals, Inc. (all of which are a trade name).

From the viewpoint of improvement in flexibility and improvement in coatability, the content of the linear hydrocarbon-based wax (D) in the thermoplastic resin composition of the present embodiment is preferably 10,000 parts by mass or less, more preferably 5,000 parts by mass or less, still more preferably 500 parts by mass or less, and yet still more preferably 100 parts by mass or less relative to 100 parts by mass of the content of the base polymer. When the content of the wax increases, the viscosity of the thermoplastic resin composition is lowered. For that reason, it is preferred to appropriately determine the content of the linear hydrocarbon-based wax (D) according to the application of the hot-melt adhesive composed of the thermoplastic resin composition.

<Oil (E)>

The thermoplastic resin composition of the present embodiment may further contain an oil (E).

The oil (E) is not particularly limited, and examples thereof include a mineral oil, such as a paraffinic process oil, a naphthenic process oil, and an isoparaffinic oil; an aromatic mineral oil-based hydrocarbon; a synthetic resin-based hydrocarbon, such a low molecular weight material, e.g., polybutene, polyisobutylene, polybutadiene, and a poly (α-olefin); an aliphatic oil-based softener, such as an alkylbenzene, castor oil, linseed oil, rapeseed oil, and coconut oil; and an ester-based plasticizer, such as dibutyl phthalate, dioctyl phthalate, dioctyl adipate, and dioctyl sebacate. Above all, at least one selected from the group consisting of a mineral oil-based hydrocarbon, a paraffinic process oil, and a naphthenic process oil is preferred, and a paraffinic oil in which the carbon number of a paraffinic hydrocarbon accounts for 50% of the total carbon number is especially preferred.

As for the mineral oil-based hydrocarbon, a weight average molecular weight is preferably 50 to 2,000, and especially 100 to 1,500; a pour point is preferably –40 to 0° C., and especially –30 to 0° C.; and a flash point (COC method) is preferably 200 to 400° C., and especially 250 to 350° C.

The pour point is a value measured in conformity with JIS K2269, and the flash point is a value measured in conformity with JIS K2265.

A kinematic viscosity at 40° C. of the oil (E) is preferably 5 cSt or more and 800 cSt or less, and more preferably 10 cSt or more and 500 cSt or less.

The kinematic viscosity is a value measured in conformity with ISO 3104.

Examples of a commercially available product of the paraffinic process oil include "Diana Process Oil PW-32", "Diana Process Oil PW-90", "Diana Process Oil PW-380", "Diana Process Oil PS-32", "Diana Process Oil PS-90", and "Diana Process Oil PS-430", manufactured by Idemitsu Kosan Co., Ltd.; and "Kaydol Oil" and "ParaLux Oil", manufactured by Chevron USA Corporation (all of which are a trade name).

Examples of a commercially available product of the isoparaffinic oil include "IP Solvent 1016", "IP Solvent 1620", "IP Solvent 2028", "IP Solvent 2835", and "IP Clean LX", manufactured by Idemitsu Kosan Co., Ltd.; and "NA Solvent" Series, manufactured by NOF Corporation (all of which are a trade name).

In the case where the thermoplastic resin composition of the present embodiment contains the oil (E), from the viewpoint of improvement in tackiness and coatability of the hot-melt adhesive and improvement in wettability with an adherend due to a lowering of the viscosity, the content of the oil (E) is preferably 5 parts by mass or more, and more preferably 10 parts by mass or more, and it is preferably 200 parts by mass or less, more preferably 100 parts by mass or less, and still more preferably 50 parts by mass or less, relative to 100 parts by mass of the content of the base polymer in the thermoplastic resin composition.

<Tackifier (F)>

The thermoplastic resin composition of the present embodiment may further contain a tackifier (F).

Examples of the tackifier (F) include materials that are solid, semi-solid, or liquid at ordinary temperature, which are composed of a hydrogenated derivative of an aliphatic hydrocarbon petroleum resin, a rosin derivative resin, a polyterpene resin, a petroleum resin, an oil-soluble phenol resin, or the like. Specifically, examples thereof include natural rosin, modified rosin, hydrogenated rosin, a glycerol ester of natural rosin, a glycerol ester of modified rosin, a pentaerythritol ester of natural rosin, a pentaerythritol ester of modified rosin, a pentaerythritol ester of hydrogenated rosin, a copolymer of natural rosin, a three-dimensional polymer of natural terpene, a hydrogenated derivative of a copolymer of hydrogenated terpene, a polyterpene resin, a hydrogenated derivative of a phenolic modified terpene resin, an aliphatic petroleum hydrocarbon resin, a hydrogenated derivative of an aliphatic petroleum hydrocarbon resin, an aromatic petroleum hydrocarbon resin, a hydrogenated derivative of an aromatic petroleum hydrocarbon resin, a cyclic aliphatic petroleum hydrocarbon resin, and a hydrogenated derivative of a cyclic aliphatic petroleum hydrocarbon resin. These may be used alone or in combination of two or more thereof. In the present embodiment, taking into consideration compatibility with the base polymer, it is preferred to use a hydrogenated material. Above all, a hydrogenated material of a petroleum resin that is excellent in heat stability is more preferred.

Examples of a commercially available product of the tackifier (F) include those mentioned below.

Examples of the tackifier which is produced by using a crude oil and a raw material obtained in the naphtha refining process include "I-MARV" (manufactured by Idemitsu Kosan Co., Ltd.); "Arkon" (manufactured by Arakawa Chemical Industries, Ltd.); "Quintone" (manufactured by Zeon Corporation); "T-REZ" (manufactured by JXTG Energy Corporation); "Escorez" and "Oppera" (manufactured by Exxon Mobil Chemical Company); "Eastotac", "Regalite", "Regalrez", and "Plastolyn" (manufactured by Eastman Chemical Company); "Sukolez" (manufactured by Kolon Industries, Inc.); and "Wingtack" and "Norsolene" (manufactured by Cray Valley USA, LLC) (all of which are a trade name).

Examples of the tackifier which is produced by using, as a raw material, an essential oil obtained from orange or the like include "Clearon" (manufactured by Yasuhara Chemical Co., Ltd.); and "Sylvalite" and "Sylvares" (manufactured by Arizona Chemical Company) (all of which are a trade name).

Examples of the tackifier which is produced by using, as a raw material, rosin or the like include "Haritack" and "Neotall" (manufactured by Harima Chemicals Group, Inc.); and "Ester Gum" and "Pensel" (manufactured by Arakawa Chemical Industries, Ltd.) (all of which are a trade name).

Although a softening point of the tackifier (F) is not particularly limited, when the softening point is too high, the coatability becomes worse due to an increase of viscosity of the hot-melt adhesive at the time of coating, whereas when the softening point is too low, the heat stability of the hot-melt adhesive becomes worse, and scorching may occur in a melter, thereby adversely affecting the adhesiveness or offensive odor. For these reasons, the softening point of the tackifier (F) is preferably 80° C. or higher, more preferably 85° C. or higher, and still more preferably 90° C. or higher, and it is preferably 150° C. or lower, more preferably 140° C. or lower, and still more preferably 125° C. or lower.

In the case where the thermoplastic resin composition of the present embodiment contains the tackifier (F), from the viewpoint of improvement in tackiness and coatability of the hot-melt adhesive, the content thereof is preferably 6 parts by mass or more, more preferably 10 parts by mass or more, still more preferably 20 parts by mass or more, even still more preferably 30 parts by mass or more, yet still more preferably 40 parts by mass or more, and even still more preferably 50 parts by mass or more, and it is preferably 400 parts by mass or less, more preferably 200 parts by mass or less, still more preferably 150 parts by mass or less, and yet still more preferably 100 parts by mass or less, relative to 100 parts by mass of the content of the base polymer in the thermoplastic resin composition.

<Nucleating Agent (G)>

The thermoplastic resin composition of the present embodiment may further contain a nucleating agent (G). In view of the fact that the thermoplastic resin composition of the present embodiment contains the nucleating agent (G), the crystallization rate of the base polymer can be more enhanced.

Specific examples of the nucleating agent (G) include an acetal-based nucleating agent, such as a sorbitol-based material and a nonitol-based material; an amide-based nucleating agent, such as a carboxamide, a triamide, and a bisamide; an organic metal salt-based nucleating agent, such as a phosphoric acid ester metal salt, a carboxylic acid metal salt, and a phenylphosphonic acid metal salt; and an inorganic fine particle-based nucleating agent, such as talc and calcium carbonate. From the viewpoint of enhancing the crystallization rate of the base polymer, the nucleating agent (G) is preferably at least one selected from the group consisting of an acetal-based nucleating agent, an amide-based nucleating agent, and an organic acid metal salt-based nucleating agent. In addition, these may be used in combination. In addition, the nucleating agent (G) may be added as a master batch within a range where the characteristics of the base polymer are not affected.

The acetal-based nucleating agent is preferably at least one selected from the group consisting of a sorbitol-based nucleating agent and a nonitol-based nucleating agent. Examples of a sorbitol derivative include 1,3:2,4-bis-O-benzylidene-D-glycitol-dibenzylidene sorbitol, 1,3:2,4-bis-O-(4-methylbenzylidene)-D-sorbitol, 1,3:2,4-bis-O-(3,4-dimethylbenzylidene)sorbitol, bis(4-propylbenzylidene) propyl sorbitol, nonitol, 1,2,3-trideoxy-4,6:5,7-bis-O-[(4-propylphenyl)methylene], and a mixture thereof. Examples of a commercially available product of the acetal-based nucleating agent include "Gelall D", "Gelall MD", and "Gelall DXR", all of which are manufactured by New Japan Chemical Co., Ltd.; and "Millad 3905", "Millad 3940", "Millad 3988", and "Millad NX8000", all of which are manufactured by Milliken Chemical Company.

The content of the nucleating agent (G) in the thermoplastic resin composition is preferably 5 ppm by mass or more, more preferably 10 ppm by mass or more, and still more preferably 50 ppm by mass or more from the viewpoint of enhancing the crystallization rate of the base polymer without lowering the physical properties of the base polymer, and it is preferably 50,000 ppm by mass or less, more preferably 20,000 ppm by mass or less, still more preferably 5,000 ppm by mass or less, and yet still more preferably 3,000 ppm by mass or less from the viewpoint of dispersibility in the base polymer, relative to 100 parts by mass of the polypropylene-based resin (A). It is preferred that when observed through visual inspection, the thermoplastic resin composition of the present invention is substantially free from visible white-spot-like cohesion to be caused owing to the nucleating agent.

<Other Additives>

If desired, the thermoplastic resin composition of the present embodiment may further contain various additives, such as a plasticizer, an inorganic filler, and an antioxidant, within a range where the effects of the present invention are not impaired.

Examples of the plasticizer include a phthalic acid ester, an adipic acid ester, a fatty acid ester, a glycol, and an epoxy-based polymer plasticizer.

Examples of the inorganic filler include barium carbonate, wollastonite, silica, clay, mica, kaolin, titanium oxide, diatomaceous earth, a urea-based resin, styrene beads, a starch, barium sulfate, calcium sulfate, magnesium silicate, magnesium carbonate, alumina, and a quartz powder.

Examples of the antioxidant include a phosphorus-based antioxidant, such as trisnonylphenyl phosphite, distearyl pentaerythritol diphosphite, "Adekastab 1178" (manufactured by ADEKA Corporation), "Sumilizer TNP" (manufactured by Sumitomo Chemical Co., Ltd.), "Irgafos 168" (manufactured by BASF SE), and "Sandstab P-EPQ" (manufactured by Sandoz); a phenol-based antioxidant, such as 2,6-di-t-butyl-4-methylphenol, n-octadecyl-3-(3',5'-di-t-butyl-4'-hydroxyphenyl) propionate, "Sumilizer BHT" (manufactured by Sumitomo Chemical Co., Ltd.), and "Irganox 1010" (manufactured by BASF SE); and a sulfur-based antioxidant, such as dilauroyl-3,3'-thiodipropionate, pentaerythritol tetrakis(3-laurylthiopropionate), "Sumilizer TPL" (manufactured by Sumitomo Chemical Co., Ltd.), "DLTP "Yoshitomi"" (manufactured by Mitsubishi Chemical Corporation), and "ANTIOX L" (manufactured by NOF Corporation).

The thermoplastic resin composition of the present embodiment may further contain other wax than the linear hydrocarbon-based wax (D). Examples of the other wax than the linear hydrocarbon-based wax (D) include animal wax, vegetable wax, carnauba wax, candelilla wax, Japan wax, bees wax, mineral wax, petroleum wax, microcrystalline wax, petrolatum, higher fatty acid wax, and higher fatty acid ester wax.

Furthermore, in the thermoplastic resin composition of the present embodiment, it is also possible to achieve partial crosslinking by the addition of a crosslinking agent, a crosslinking aid, or the like.

Examples of the crosslinking agent include an organic peroxide, sulfur, a sulfur compound, and a phenol-based vulcanizer, such as a phenol resin. Of these, an organic peroxide is preferred. Specific examples of the organic peroxide include 2,5-dimethyl-2,5-di(t-butylperoxy)-hexane, 2,5-dimethyl-2,5-di(t-butylperoxy)-3-hexyne, 2,5- dimethyl-2,5-di(benzoylperoxy)-hexane, t-butylperoxy benzoate, dicumyl peroxide, t-butylcumyl peroxide, diisopropylbenzene hydroperoxide, 1,3-bis(t-butylperoxyisopropyl)benzene, benzoyl peroxide, 1,1-di(t-butylperoxy)-3,3,5-trimethylcyclohexane, di-t-butyl peroxide, n-butyl-4,4-bis(t-butylperoxy)valerate, p-chlorobenzoyl peroxide, 2,4-dichlorobenzoyl peroxide, t-butylperoxyisopropyl carbonate, diacetyl peroxide, and lauroyl peroxide. Of these, from the standpoint of offensive odor and scorch stability, 2,5-dimethyl-2,5-di(t-butylperoxy)hexane, 2,5-dimethyl-2,5-di(t-butylperoxy)-3-hexyne, 1,3-bis(t-butylperoxyisopropyl)benzene, 1,1-bis(t-butylperoxy)-3,3,5-trimethylcyclohexane, and n-butyl-4,4-bis(t-butylperoxy)valerate are preferred, and above all, 1,3-bis(t-butylperoxyisopropyl) benzene is most preferred.

Examples of the crosslinking aid include N-methyl-N,4-dinitrosoaniline, nitrosobenzene, diphenyl guanidine, divinylbenzene, trimethylolpropane tri(meth)acrylate, ethylene di(meth)acrylate, diethylene glycol di(meth)acrylate, allyl (meth)acrylate, diallyl phthalate, triallyl cyanurate, quinone dioxime, p,p'-dibenzoylquinone dioxime, bismaleimide, phenylene bismaleimide, trimethylolpropane-N,N'-m-phenylene dimaleimide, polyethylene glycol dimethacrylate, vinyl butyral, vinyl stearate, an unsaturated silane compound, and sulfur. By using such a crosslinking aid, a homogenous and mild crosslinking reaction can be expected.

Of these crosslinking aids, triallyl cyanurate, ethylene glycol dimethacrylate, divinylbenzene, and bismaleimide are preferred. These are easy in handling, are favorable in compatibility with the propylene-based polymer (A) that is a main component of the crosslinking product, have an action to solubilize the organic peroxide, and work as a dispersant of the organic peroxide. Thus, the crosslinking effect owing to the heat treatment is homogenous, and a resin composition with a favorable balance between flexibility and physical properties is provided.

Each of the crosslinking agent and the crosslinking aid may be used alone or may be used in combination of two or more thereof.

In the case of using the crosslinking agent and the crosslinking aid, the degree of crosslinking can be regulated by arbitrarily using them within a range of 0.1 to 5 parts by mass relative to 100 parts by mass of the total amount of the components (A) to (G).

In the case of using an unsaturated silane compound as the crosslinking aid, the crosslinking can be allowed to proceed by further bringing into contact with the moisture in the presence of a silanol condensation catalyst.

<Production Method of Thermoplastic Resin Composition>

Although the production method of the thermoplastic resin composition of the present embodiment is not particularly limited, it is preferred to include at least a step of mixing the base polymer and the propylene-based polymer (C) at lower than 160° C. Specifically, the thermoplastic resin composition of the present embodiment can be produced by mixing the propylene-based polymer (A) and the propylene-based polymer (C) and optionally, at least one selected from the group consisting of the ethylene-based polymer (B), the linear hydrocarbon-based wax (D), the oil (E), the tackifier (F), the nucleating agent (G), and various additives. Although the temperature at the time of mixing is not particularly limited, from the viewpoint of providing this thermoplastic resin composition having a favorable appearance, it is preferred to perform the mixing at lower than 160° C.

[Hot-Melt Adhesive]

The hot-melt adhesive of the present embodiment is composed of the aforementioned thermoplastic resin composition.

The hot-melt adhesive of the present embodiment contains the propylene-based polymer (A) as the base polymer, and therefore, it is favorable in followability to an adherend and excellent in adhesiveness (in particular, adhesive strength). When a predetermined amount of the propylene-based polymer (C) and optionally, the nucleating agent (G) are contained, the solidification speed can be improved.

The hot-melt adhesive composed of the thermoplastic resin composition of the present embodiment can be suitably used for, for example, sanitary materials, bookbinding, fibers, can manufacturing, filters, low-pressure molding, and bag making. Specifically, the hot-melt adhesive composed of the thermoplastic resin composition of the present embodiment can be suitably used for the packaging field (e.g., fixing of carton, cardboard, and cushioning material, repairing of automatic paper container packaging line, fixing of sample, packaging after wrapping, checking and unpacking, and packing desiccants in food packaging), electrical materials (e.g., fixing of electronic parts on C-board, temporary fixing, anti-vibration reinforcement, filling of connector empty space, board insulation, wire fixing, and encapsulation), film adhesive processing, non-slip (film coating of DM, etc.), housing, building materials (e.g., siding, tile, flooring, carpet, fabric, wallpaper, and sample adhesion), architecture/interior (e.g., adhesion of insulation material, kitchen tarpaulin, prevention of fraying when cutting tatami, roof, veranda FRP, crack, and tile), furniture, woodwork (e.g., tables, chairs, sofas, beds, mirror cabinets, fixing of reinforcements, bonding of fabric, fixing of frills, Buddhist altars, and binding), hobby, bonding of small goods, accessories, traditional crafts, and automotive industry (e.g., adhesion of dashboard anti-vibration reinforcement, adhesion of head/lamp case, door interior materials, thermal insulation and vibration-insulating and sound-insulating materials, filters, temporary fixing in the assembly process, ceiling materials, sofas, and carpets and mats for trunks), mattresses (e.g., pasting or assembly of pocket coil, textile, and foams), sanitary materials (e.g., assembly of diapers and sanitary products), medical care (e.g., assembly of sheets, surgical gowns, and masks), textile laminates, assembly uses represented by automobile floor mats, and sanitary material applications represented by fixing of nonwoven fabrics or superabsorbent polymers (SAP).

The hot-melt adhesive with an enhanced solidification speed is useful for various applications.

For example, in the case of a sanitary material application, when applied to a nonwoven fabric, ooze-through is prevented from occurring. In addition, on the occasion of application at the time of sticking adherends to each other, an initial adhesive strength (green strength) is improved. According to this, deviation of the sticking position during the in-line of the sticking process can be prevented from occurring.

In the case of wrapping application, on the occasion of granulating the blend and then packing in a box, in view of the fact that pellets are quickly set, deformation to be caused owing to a load is suppressed, and blocking among the pellets can be suppressed.

In the case of woodworking application, in a bonding method in which the hot-melt adhesive is applied to an adherend and then once wound around a roll, when the solidification of the hot-melt adhesive is not fast, all of the rolls are bonded and integrated. When the solidification is fast, it becomes possible to perform winding.

In the case of mattress application, bonding among pocket coils is performed by an automated assembly machine. After the pocket coils are bonded to each other, the adhesive strength is required to be early developed in order to prevent deviation from occurring, and therefore, an enhancement of the solidification speed is useful.

In the case of other assembly applications, the hot melt adhesive may be applied and stuck using a handgun. On that occasion, the set time becomes short, and therefore, the adhesive strength immediately after sticking is improved.

The content of the base polymer occupying in the hot-melt adhesive can be appropriately determined according to various applications.

For example, in the case of the sanitary material application, the content of the base polymer can be set to 20 to 50% by mass relative to 100% by mass of the hot-melt adhesive.

In the case of the packaging application, the content of the base polymer can be set to 30 to 70% by mass relative to 100% by mass of the hot-melt adhesive.

In the case of the woodworking application, the content of the base polymer can be set to 70 to 100% by mass relative to 100% by mass of the hot-melt adhesive.

In the case of the mattress application, the content of the base polymer can be set to 40 to 100% by mass relative to 100% by mass of the hot-melt adhesive.

EXAMPLES

The present invention is hereunder described in more detail by reference to Examples, but it should be construed that the present invention is by no means limited by these Examples.

The raw materials used in the Examples and Comparative Examples are as follows.

<Propylene-Based Polymer (A)>
(A-1) "L-MODU S400": propylene homopolymer, manufactured by Idemitsu Kosan Co., Ltd., melting endotherm ($\Delta$H-D)=36 J/g, melting point (Tm-D)=80° C.

<Ethylene-Based Polymer (B)>
(B-1) "Affinity GA 1900": ethylene-octene random copolymer, manufactured by The Dow Chemical Company, melting endotherm ($\Delta$H-D)=60 J/g, melting point (Tm-D)=70° C.
(B-2) "infuse 9807": ethylene-octene block copolymer, manufactured by The Dow Chemical Company, melting endotherm ($\Delta$H-D)=20 J/g, melting point (Tm-D)=120° C.

<Propylene-Based Polymer (C)>
(C-1) "Prime Polypro Y-2045GP": propylene-ethylene random copolymer, manufactured by Prime Chemical Co., Ltd., melting endotherm ($\Delta$H-D)=80 J/g, melting point (Tm-D)=130° C.
(C-2) "Hi-WAX NP500": propylene homopolymer, manufactured by Mitsui Chemicals, Inc., melting endotherm ($\Delta$H-D)=100 J/g, melting point (Tm-D)=160° C.
(C-3) "Hi-WAX NP506": propylene-ethylene-butene ternary random copolymer, manufactured by Mitsui Chemicals, Inc., melting endotherm ($\Delta$H-D)=85 J/g, melting point (Tm-D)=130° C.
(C-4) "Hi-WAX NP50605": maleic acid-modified propylene-ethylene-butene ternary random copolymer, manufactured by Mitsui Chemicals, Inc., melting endotherm ($\Delta$H-D)=75 J/g, melting point (Tm-D)=130° C.

<Linear Hydrocarbon-Based Wax (D)>
(D-1) "Sasol H-1": Fischer-Tropsch wax, manufactured by Sasol Limited, melting endotherm ($\Delta$H-D)=220 J/g, melting point (Tm-D)=110° C.

<Oil (E)>
(E-1) "Diana Process Oil PW-90": paraffinic oil, manufactured by Idemitsu Kosan Co., Ltd., kinematic viscosity at 40° C.=90 cSt <Tackifier (F)>
(F-1) "Escorez 5300": DCPD-based hydrogenated petroleum resin, manufactured by Exxon Mobil Chemical Company, softening point=100° C.
(F-2) "Eastotac H-130W": C5-based hydrogenated petroleum resin, manufactured by Eastman Chemical Company, softening point=125° C.
(F-3) "Eastotac H-130R": C5-based hydrogenated petroleum resin, manufactured by Eastman Chemical Company, softening point=125° C.

<Nucleating Agent (G)>
(G-1) "Gelall D": sorbitol-based nucleating agent, manufactured by New Japan Chemical Co., Ltd.

[DSC Measurement]

The melting endotherm ($\Delta$H-D) was determined from a melting endothermic curve obtained in a manner in which using a differential scanning calorimeter (DSC) ("DSC 7", manufactured by PerkinElmer), 10 mg of a sample was kept at −10° C. in a nitrogen atmosphere for 5 minutes and then subjected to temperature rise at a rate of 10° C./min. In addition, the melting point (Tm-D) was determined from a peak top of peaks observed at a highest temperature side of the obtained melting endothermic curve.

The melting endotherm ($\Delta$H-D) is calculated in a manner in which when a line connecting a point at a low-temperature side at which no heat quantity change is observed with a point at a high-temperature side at which no heat quantity change is observed is designated as a base line, an area surrounded by a line portion containing a peak of the melting endothermic curve obtained by the DSC measurement with a differential scanning calorimeter (DSC) ("DSC 7", manufactured by PerkinElmer) and the base line is determined.

[Softening Point]

The softening point was measured by the ring and ball method in conformity with JAI7-1991.

Examples 1 to 23 and Comparative Examples 1 to 11

In a heat-resistant glass bottle having a capacity of 100 mL, the components described in each of Tables 1 to 5 were charged such that the total content was 60 g and heated at 200° C. over 30 minutes, to melt the contents. Thereafter, the contents were stirred with a spatula for 5 minutes and heated at 200° C. for 10 minutes. The foregoing operation was repeated 5 times, to obtain a hot-melt adhesive composed of a thermoplastic resin composition. The obtained hot-melt adhesive was taken out into a vat coated with polytetrafluoroethylene and then measured for a solidification time by the following method. The results are shown in Tables 1 to 5.

(Measurement of Solidification Time Using Rheometer)

Using a rheometer ("MCR301", manufactured by Anton Paar GmbH), the hot-melt adhesive was subjected to temperature lowering on a P&P plate from 150° C. to 25° C. at a rate of $(141 \times e^{-0.02 \times elapsed\ time})°$ C./min at a gap of 1 mm and at a frequency of 1 Hz while arbitrarily setting a strain such that a torque was the detection lower limit or more. Then, at the time of keeping at 25° C., when the time at which the temperature lowering started was designated as 0 second, a time when the viscosity exceeded 1×10⁵ Pa·s was defined as "solidification time using rheometer".

(Measurement of Solidification Time Using Hardness Meter)

20 g of the hot-melt adhesive was weighed in an aluminum-made cup having a diameter of 50 mm and a depth of 15 mm and then heat-melted at 180° C. for 30 minutes. After completion of heat-melting, a cooling spray was sprayed for 10 seconds on the surface of the hot-melt adhesive in the state of being charged in the aluminum-made cup. Then, the aluminum-made cup was put into 1 L of ice water and cooled. After 1.5 minutes, the resulting aluminum-made cup was taken out from the ice water, and 30 seconds after taking out the aluminum-made cup from the ice water, a relation between the elapsed time and the Shore A hardness was examined with a hardness meter ("WR-104A", manufactured by Nishi Tokyo Seimitsu Co., Ltd.). When the time of immersion in the ice water was designated as 0 second, a time until the Shore A hardness exceeded 80 or 90 was defined as "solidification time using hardness tester". In Examples 3, 4, and 14 and Comparative Examples 2 and 6, a time when the Shore A hardness exceeds 90 was defined as "solidification time using hardness tester (initial hardness A)", and in Examples 15 to 18 and Comparative Example 7, a time when the Shore A hardness exceeds 80 was defined as "solidification time using hardness meter (initial hardness B)".

(Measurement of Constant Temperature Creep (Peel) at 60° C.)

The constant temperature creep is one of indices indicating the heat creep resistance of the adhesive. The longer the peeling time, the better the heat creep resistance, and peeling is hardly caused on the occasion of transportation or the like, and hence, such is preferred.

The hot-melt adhesive which had been heat-melted at 180° C. was applied onto a K-liner cardboard at a coating amount of 2.8 to 3.2 g/m, and after an open time of 2 seconds was taken, sticking was performed under a condition at an adhesive pressure of 2 kg/25 cm² and a set time of 2 seconds. The adhesion test piece was allowed to stand for 24 hours in an environment at 23° C. and at a humidity of 50%. The prepared test piece was applied with a load of 200 g/g/25 cm² in an environment at 60° C. and at a humidity of 30% in a direction in which the load was applied at 180° C. in a direction of peeling, and the time until the stuck sample was peeled was measured. The measurement was performed five times, and an average value of three points excluding the longest and shortest peeling times was defined as a value of the test of constant temperature creep (peel) at 60° C.

(Measurement of Temperature Rise Creep (Shear))

The temperature rise creep is one of indices indicating the heat creep resistance of the adhesive. The higher the peeling temperature, the better the heat creep resistance, and peeling is hardly caused on the occasion of transportation or the like, and hence, such is preferred.

The hot-melt adhesive which had been heat-melted at 180° C. was applied onto a K-liner cardboard at a coating amount of 2.8 to 3.2 g/m, and after an open time of 2 seconds was taken, sticking was performed under a condition at an adhesive pressure of 2 kg/25 cm² and a set time of 2 seconds. The adhesion test piece was allowed to stand for 24 hours in an environment at 23° C. and at a humidity of 50%. The prepared test piece was applied with a load of 200 g/g/25 cm² in an environment at 60° C. and at a humidity of 30% in a direction in which the load was applied in a direction of shearing, and the temperature was raised at a rate of 30° C./h. The temperature at which the stuck sample was peeled was measured. The measurement was performed five times, and an average value of three points excluding the longest and shortest peeling times was defined as a value of the test of temperature rise creep (share).

TABLE 1

| | | | Comparative Example 1 | Example 1 | Example 2 | Comparative Example 3 | Example 5 | Example 6 |
|---|---|---|---|---|---|---|---|---|
| Blending ratio (parts by mass) | | | phr | phr | phr | phr | phr | phr |
| Propylene-based polymer (A) | A-1 | L-MODU S400 (C3) | 50 | 50 | 50 | 30 | 30 | 30 |
| Ethylene-based polymer (B) | B-1 | Affinity GA1900 (C2/C8) | | | | | | |
| | B-2 | Infuse 9807 (C2/C8-block) | | | | 10 | 10 | 10 |
| Propylene-based polymer (C) | C-1 | Y-2045GP (rPP) | | 1 | 10 | | | |
| | C-2 | Hi-WAX NP500 (hPP) | | | | | 1 | 10 |
| | C-3 | Hi-WAX NP506 (rPP) | | | | | | |
| | C-4 | Hi-WAX NP50605 (modified rPP) | | | | | | |
| Linear hydrocarbon-based wax (D) | D-1 | Sasol H-1 (FT) | | | | | | |
| Oil (E) | E-1 | PW-90 | 10 | 10 | 10 | 20 | 20 | 20 |
| Tackifier (F) | F-1 | Escorez5300 (DCPD) | 40 | 40 | 40 | 40 | 40 | 40 |
| | F-2 | Eastotac H-130W (C5) | | | | | | |
| | F-3 | Eastotac H-130R (C5) | | | | | | |
| Nucleating agent (G) | G-1 | Gelall D | | | | | | |
| Evaluation item | | Solidification timing (rheometer)/min | 300 | 80 | 70 | 480 | 107 | 9 |

TABLE 2

| Blending ratio (parts by mass) | | | Comparative Example 4 | Example 7 | Example 8 | Example 9 | Example 10 | Example 11 | Example 12 | Comparative Example 5 | Example 13 |
|---|---|---|---|---|---|---|---|---|---|---|---|
| | | | phr | phr | phr | phr | phr | phr | phr | phr | phr |
| Propylene-based polymer (A) | A1 | L-MODU S400 (C3) | 80 | 76 | 79.2 | 76 | 76 | 79.2 | 76 | 60 | 57 |
| Ethylene-based polymer (B) | B-1 | Affinity GA1900 (C2/C8) | | | | | | | | | |
| | B-2 | Infuse 9807 (C2/C8-block) | | | | | | | | | |
| Propylene-based polymer (C) | C-1 | Y-2045GP (rPP) | | | | | | | | | |
| | C-2 | FH-WAX NP500 (hPP) | | | | | | 1 | 5 | | 5 |
| | C-3 | FH-WAX NP506 (rPP) | | | | 1 | 5 | 5 | | | |
| | C-4 | Hi-WAX NP50605 (modified rPP) | | | 5 | | | | | | |
| Linear hydrocarbon-based wax (D) | D-1 | Sasol H-1 (FT) | | | | | | | | | |
| Oil (E) | E-1 | PW-90 | | | | | | | | | |
| Tackifier (F) | F-1 | Escorez5300 (DCPD) | 20 | 19 | 19.8 | 19 | 19 | 19.8 | 19 | 40 | 38 |
| | F-2 | Eastotac H-130W (C5) | | | | | | | | | |
| | F-3 | Eastotac H-130R (C5) | | | | | | | | | |
| Nucleating agent (G) | G-1 | Gelall D | | | | | | | 0.2 | | |
| Evaluation item | | Solidification timing (rheometer)/min | 88 | 13 | 15 | 13 | 11 | 13 | 12 | 230 | 20 |

TABLE 3

| Blending ratio (parts by mass) | | | Comparative Example 2 | Example 3 | Example 4 | Comparative Example 6 | Example 14 |
|---|---|---|---|---|---|---|---|
| | | | phr | phr | phr | phr | phr |
| Propylene-based polymer (A) | A-1 | L-MODU S400 (C3) | 20 | 20 | 20 | 10 | 10 |
| Ethylene-based polymer (B) | B-1 | Affinity GA1900 (C2/C8) | 20 | 20 | 20 | 30 | 30 |
| | B-2 | Infuse 9807 (C2/C8-block) | | | | | |
| Propylene-based polymer (C) | C-1 | Y-2045GP (rPP) | | | | | |
| | C-2 | Hi-WAX NP500 (hPP) | | 5 | 10 | | |
| | C-3 | Hi-WAX NP506 (rPP) | | | | | 2 |
| | C-4 | Hi-WAX NP50605 (modified rPP) | | | | | |
| Linear hydrocarbon-based wax (D) | D-1 | Sasol H-1 (FT) | 20 | 20 | 10 | 20 | 20 |
| Oil (E) | E-1 | PW-90 | | | | | |
| Tackifier (F) | F-1 | Escorez5300 (DCPD) | | | | | |
| | F-2 | Eastotac H-130W (C5) | 40 | 40 | 40 | 40 | 40 |
| | F-3 | Eastotac H-130R (C5) | | | | | |
| Nucleating agent (G) | G-1 | Gelall D | | | | | |
| Evaluation item | | Solidification timing (initial hardness A))/h *1 | 144 | 2.5 | 2 | 120 | 6 |

*1: Time when the Shore A hardness exceeds 90

TABLE 4

|  |  |  | Comparative Example | Example | | | |
|---|---|---|---|---|---|---|---|
|  |  |  | 7 | 15 | 16 | 17 | 18 |
| Blending ratio (parts by mass) |  |  | phr | phr | phr | phr | phr |
| Propylene-based polymer (A) | A-1 | L-MODU S400 (C3) | 5 | 2.5 | 2.5 | 3.75 | 3.75 |
| Ethylene-based polymer (B) | B-1 | Affinity GA1900 (C2/C8) | 35 | 35 | 35 | 35 | 35 |
|  | B-2 | Infuse 9807 (C2/C8-block) |  |  |  |  |  |
| Propylene-based polymer (C) | C-1 | Y-2045GP (rPP) |  |  |  |  |  |
|  | C-2 | Hi-WAX NP500 (hPP) |  | 2.5 |  | 1.25 |  |
|  | C-3 | Hi-WAX NP506 (rPP) |  |  | 2.5 |  | 1.25 |
|  | C-4 | Hi-WAX NP50605 (modified rPP) |  |  |  |  |  |
| Linear hydrocarbon-based wax (D) | D-1 | Sasol H-1 (FT) | 25 | 25 | 25 | 25 | 25 |
| Oil (E) | E-1 | PW-90 |  |  |  |  |  |
| Tackifier (F) | F-1 | Escorez5300 (DCPD) |  |  |  |  |  |
|  | F-2 | Eastotac H-130W (C5) |  |  |  |  |  |
|  | F-3 | Eastotac H-130R (C5) | 35 | 35 | 35 | 35 | 35 |
| Nucleating agent (G) | G-1 | Gelall D |  |  |  |  |  |
| Evaluation item |  | Solidification timing (initial hardness B))/h *2 | 18 | 2 | 2.5 | 4 | 6 |
|  |  | Constant temperature creep (peel) at 60° C./min | 22 | 62 | 63 | 55 | 55 |

*2: Time when the Shore A hardness exceeds 80

TABLE 5

|  |  |  | Comparative Example | Example | Example | Comparative Example | Example | Comparative Example | Example | Comparative Example | Example |
|---|---|---|---|---|---|---|---|---|---|---|---|
|  |  |  | 8 | 19 | 20 | 9 | 21 | 10 | 22 | 11 | 23 |
| Blending ratio (parts by mass) |  |  | phr | phr | phr | phr | phr | phr | phr | phr | phr |
| Propylene-based polymer (A) | A-1 | L-MODU S400 (C3) | 100 | 95 | 65 | 95 | 61.75 | 85 | 55.25 | 70 | 45.5 |
| Ethylene-based polymer (B) | B-1 | Affinity GA1900 (C2/C8) |  |  |  |  |  |  |  |  |  |
|  | B-2 | Infuse 9807 (C2/C8-block) |  |  |  |  |  |  |  |  |  |
| Propylene-based polymer (C) | C-1 | Y-2045GP (rPP) |  |  |  |  |  |  |  |  |  |
|  | C-2 | Hi-WAX NP500 (hPP) |  |  |  |  |  |  |  |  |  |
|  | C-3 | Hi-WAX NP506 (rPP) |  | 5 | 35 |  | 33.25 |  | 29.75 |  | 24.5 |
|  | C-4 | Hi-WAX NP50605 (modified rPP) |  |  |  |  |  |  |  |  |  |
| Linear hydrocarbon-based wax (D) | D-1 | Sasol H-1 (FT) |  |  |  |  |  |  |  |  |  |
| Oil (E) | E-1 | PW-90 |  |  |  |  |  |  |  |  |  |
| Tackifier (F) | F-1 | Escorez5300 (DCPD) |  |  |  | 5 | 5 | 15 | 15 | 30 | 30 |
|  | F-2 | Eastotac H-130W (C5) |  |  |  |  |  |  |  |  |  |
|  | F-3 | Eastotac H-130R (C5) |  |  |  |  |  |  |  |  |  |
| Nucleating agent (G) | G-1 | Gelall D |  |  |  |  |  |  |  |  |  |
| Evaluation item |  | Solidification timing (rheometer)/min | 36 | 13 | 12 | 40 | 13 | 67 | 14 | 150 | 16 |
|  |  | Temperature rise creep (share) (30° C./h)/° C. | 89 | 97 | 120 | — | — | 84 | 120 | — | — |

The hot-melt adhesive composed of the thermoplastic resin composition of the present invention is excellent in the solidification speed. Specifically, in Comparative Example 1, the solidification time using a rheometer is 300 minutes so that the solidification time is relatively long, whereas in Examples 1 and 2 containing the propylene-based polymer (C), the solidification time using a rheometer is 80 minutes and 70 minutes, respectively so that the solidification time is short. Thus, it is noted that the hot-melt adhesive composed of the thermoplastic resin composition of the present invention is excellent in the solidification speed.

Similarly, from comparison of Comparative Example 3 with Examples 5 and 6, comparison of Comparative Example 4 with Examples 7 to 12, comparison of Comparative Example 5 with Example 13, comparison of Comparative Example 2 with Examples 3 and 4, comparison of Comparative Example 6 with Example 14, comparison of Comparative Example 7 with Examples 15 to 18, comparison of Comparative Example 8 with Examples 19 and 20, comparison of Comparative Example 9 with Example 21, comparison of Comparative Example 10 with Example 22, and comparison of Comparative Example 11 with Example 23, it is noted that the hot-melt adhesives each composed of the thermoplastic resin composition of the present invention are excellent in the solidification speed, respectively.

In addition, from comparison of Comparative Example 7 with Examples 15 to 18, it is noted that the hot-melt adhesive composed of the thermoplastic resin composition of the present invention is not only excellent in the solidification speed but also excellent in the heat creep resistance.

In addition, from comparison of Comparative Example 8 with Examples 19 and 20 and comparison of Comparative Example 10 with Example 22, it is noted that the hot-melt adhesives each composed of the thermoplastic resin composition of the present invention are not only excellent in the solidification speed but also excellent in the heat creep resistance, respectively.

The invention claimed is:

1. A thermoplastic resin composition, comprising:
    a base polymer comprising (A) a propylene-based polymer (A) having a melting endotherm ($\Delta$H-D) in a range of from 0 to 60 J/g, and a melting point (Tm-D) is in a range of from 0 to 120° C., and (B) an ethylene-based polymer having a melting endotherm ($\Delta$H-D) in a range of from 0 to 120 J/g; and
    a propylene-based polymer (C) in which a melting endotherm ($\Delta$H-D) is in a range of from 20 to 120 J/g, and a melting point (Tm-D) is higher than 120° C.,
    wherein a content of the propylene-based polymer (C) is in a range of from 0.5 to 50 parts by mass, relative to 100 parts by mass of the propylene-based polymer (A),
    wherein the ethylene-based polymer (B) is present in 10,000 parts by mass or less, relative to 100 parts by mass of the propylene-based polymer (A), and
    wherein the propylene-based polymer (A) is a propylene homopolymer.

2. The composition of claim 1, wherein the melting point (Tm-D) of the propylene-based polymer (C) is 150° C. or lower.

3. The composition of claim 1, wherein a total content of the propylene-based polymer (A) and the ethylene-based polymer (B) occupying in the thermoplastic resin composition is more than 70% by mass.

4. The composition of claim 1, wherein a total content of the propylene-based polymer (A) and the ethylene-based polymer (B) occupying in the thermoplastic resin composition is 70% by mass or less.

5. The composition of claim 1, wherein the content of the propylene-based polymer (A) is 50% by mass or more, relative to a total mass of the propylene-based polymer (A) and the ethylene-based polymer (B).

6. The composition of claim 1, further comprising:
    a linear hydrocarbon-based wax (D) in which a melting endotherm ($\Delta$H-D) is more than 120 J/g and 300 J/g or less,
    wherein a content of the linear hydrocarbon-based wax (D) is 10,000 parts by mass or less, relative to 100 parts by mass of the base polymer.

7. The composition of claim 1, wherein the propylene-based polymer (A) comprises a structural unit selected from the group consisting of ethylene and an $\alpha$-olefin having 4 to 30 carbon atoms in an amount of more than 0 mol % and 40 mol % or less.

8. The composition of claim 1, further comprising:
    an oil (E).

9. The composition of claim 1, further comprising:
    a tackifier (F).

10. The composition of claim 1, further comprising:
    a nucleating agent (G).

11. The composition of claim 10, wherein the nucleating agent (G) is at least one selected from the group consisting of a sorbitol-based nucleating agent and a nonitol-based nucleating agent.

12. A method of producing the thermoplastic resin composition of claim 1, the method comprising:
    mixing at least the base polymer and the propylene-based polymer (C) at lower than 160° C.

13. A hot-melt adhesive, comprising:
    the thermoplastic resin composition of claim 1.

14. A thermoplastic resin composition, comprising:
    a base polymer comprising (A) a propylene-based polymer (A) having a melting endotherm ($\Delta$H-D) in a range of from 0 to 60 J/g, and a melting point (Tm-D) is not observed, and (B) an ethylene-based polymer having a melting endotherm ($\Delta$H-D) in a range of from 0 to 120 J/g; and
    a propylene-based polymer (C) in which a melting endotherm ($\Delta$H-D) is in a range of from 20 to 120 J/g, and a melting point (Tm-D) is higher than 120° C.,
    wherein a content of the propylene-based polymer (C) is in a range of from 0.5 to 50 parts by mass, relative to 100 parts by mass of the propylene-based polymer (A),
    wherein the ethylene-based polymer (B) is present in 10,000 parts by mass or less, relative to 100 parts by mass of the propylene-based polymer (A), and
    wherein the propylene-based polymer (A) is a propylene homopolymer.

15. The composition of claim 14, wherein the melting point (Tm-D) of the propylene-based polymer (C) is 150° C. or lower.

16. The composition of claim 14, wherein a total content of the propylene-based polymer (A) and the ethylene-based polymer (B) occupying in the thermoplastic resin composition is more than 70% by mass.

17. The composition of claim 14, wherein a total content of the propylene-based polymer (A) and the ethylene-based polymer (B) occupying in the thermoplastic resin composition is 70% by mass or less.

18. The composition of claim 14, wherein the content of the propylene-based polymer (A) is 50% by mass or more, relative to a total mass of the propylene-based polymer (A) and the ethylene-based polymer (B).

19. The composition of claim 14, further comprising:
a linear hydrocarbon-based wax (D) in which a melting endotherm (ΔH-D) is more than 120 J/g and 300 J/g or less,
wherein a content of the linear hydrocarbon-based wax (D) is 10,000 parts by mass or less, relative to 100 parts by mass of the base polymer.

20. The composition of claim 14, wherein the propylene-based polymer (A) comprises a structural unit selected from the group consisting of ethylene and an α-olefin having 4 to 30 carbon atoms in an amount of more than 0 mol % and 40 mol % or less.

\* \* \* \* \*